United States Patent [19]
Olson, Jr.

[11] 3,904,962
[45] Sept. 9, 1975

[54] IMPATT DIODE TESTING
[75] Inventor: Hilding Matthews Olson, Jr., Mohnton, Pa.
[73] Assignee: Bell Telephone Laboratories, Incorporated, Murray Hill, N.J.
[22] Filed: Oct. 21, 1974
[21] Appl. No.: 516,793

[52] U.S. Cl. ............................................ 324/158 D
[51] Int. Cl.² .......................................... G01R 31/26
[58] Field of Search ......... 324/158 D, 158 T, 158 R

[56] References Cited
UNITED STATES PATENTS
3,659,199   4/1972   Knutson ......................... 324/158 D Primary Examiner—Alfred E. Smith
Assistant Examiner—Ernest F. Karlsen
Attorney, Agent, or Firm—H. W. Lockhart

[57] ABSTRACT

A pulse technique and network are described for measuring the reverse leakage current of an operating IMPATT diode. Observation under substantially operating conditions is attained by pulsing the diode under test out of the avalanche condition very briefly and observing the reverse leakage current. High reverse leakage currents under these conditions indicate likelihood of "short out" failure.

7 Claims, 4 Drawing Figures

DIODE VOLTAGE

20V

2μs

DIODE CURRENT

.1mA

2μs

IMPATT DIODE TESTING

This invention relates to the reliability testing of semiconductor diodes that operate in the avalanche mode of the type generally referred to as Impact-Avalanche Transit Time (IMPATT) diodes.

BACKGROUND OF THE INVENTION

Semiconductor IMPATT diodes, fabricated generally from silicon or gallium arsenide semiconductor material for operation in the avalanche mode, ordinarily fail in two different ways. The first failure mode involves a gradual shift in diode characteristics to the point where the diode becomes inefficient or excessively noisy. The second type of failure mode involves the sudden unpredictable shorting out of the depletion layer within the diode. This type of failure is referred to both as a shortout or a burnout and the mechanism by which it occurs and the reasons for it are not fully understood. However, the primary concern with this type of failure is its unpredictability and its immediate catastrophic effect. This is in contrast to the first-mentioned type of failure wherein the need to replace the diode can be anticipated during operation.

Reliability testing of semiconductor diodes is a well known and standard practice and generally involves the high stress or accelerated aging of the devices to eliminate those most susceptible to failure in operation.

It is known also, for example, to test rectifier type diodes by operating them at relatively high forward bias to produce stressful high P-N junction temperatures, followed by relatively brief interruptions during which observations are made of the reverse leakage current. Such measurements yield useful information regarding the operating characteristics of such diodes.

However, the prediction of the likelihood of catastrophic failure in IMPATT diodes has thus far eluded workers in the art insofar as applicant is aware. Testing of IMPATT diodes under stress conditions presents difficulties by the very nature of the avalanche operating mode in which the avalanche current masks the reverse leakage current. Moreover, this avalanche process is thermally stabilizing in that, as the temperature of the IMPATT diode rises, the avalanche multiplication factor decreases, which tends thereby to lower the temperature. This effect counters the tendency of the reverse leakage current, which arises from carriers possessing sufficient thermal energy to surmount the potential barrier of a reverse-biased junction, to be thermally unstable and to cause failure by thermal runaway in an overheated semiconductor diode. However, a means of predicting the likelihood of catastrophic failure in IMPATT diodes is of considerable importance because of the kind of application in which diodes of this type are generally used. Catastrophic failure may result, for example, in the loss of significant parts of a communication transmission system.

SUMMARY OF THE INVENTION

This invention is based in considerable part upon the recognition by applicant that IMPATT diodes exhibiting relatively high reverse leakage currents have a higher likelihood of castastrophic failure by shortout than other IMPATT diodes. The problem of observing reverse leakage current in an IMPATT diode has been met in a circuit by means of which an IMPATT diode, while being operated in avalanche mode at full power, and high junction temperature, can be periodically dropped out of avalanche for a very short time, during which interval the reverse leakage current may be observed. This is accomplished by utilizing a pulse generator to produce a relatively steep-front, short voltage pulse of only a few microseconds duration. It has been determined that under such conditions, even though the semiconductor chip itself has a short thermal time constant and therefore, tends to cool rapidly when its power dissipation is interrupted, the associated heat sink for the chip will store enough heat to keep the junction temperature high during the measurement.

In a specific embodiment a circuit for measuring pulse leakage current in reverse includes a direct current supply for maintaining the IMPATT diode under test in the avalanche condition. In parallel with this supply, but suitably isolated from it, is an electronic pulse generator for providing a pulse of suitable polarity and magnitude for causing the IMPATT diode to be withdrawn from the avalanche operating mode, although still remaining in a state of reverse bias. A monitoring resistor is connected in series with the diode and across an oscilloscope to provide means for measuring the reverse leakage current of the diode.

The operation of this circuit is enhanced by the addition of a first diode in parallel with the monitoring resistor to enable bypassing of the avalanche operating current around the resistor. A separate small d-c voltage source cuts off this first diode when the voltage pulse for withdrawing the device from avalanche is present, thereby providing that all the leakage current through the diode under test also flows through the monitoring resistor.

For convenience a further oppositely poled diode is added across the resistor to enable rapid withdrawal of stored charge from the diode under test upon the termination of the pulse.

Using the circuit in accordance with this invention IMPATT diodes may be tested in substantially avalanche operating conditions, and those devices exhibiting inordinately high reverse leakage currents can be detected.

BRIEF DESCRIPTION OF THE DRAWING

The invention and its objects and features may be better understood from the following description taken in conjunction with the drawing in which.

DETAILED DESCRIPTION

Figure 1:
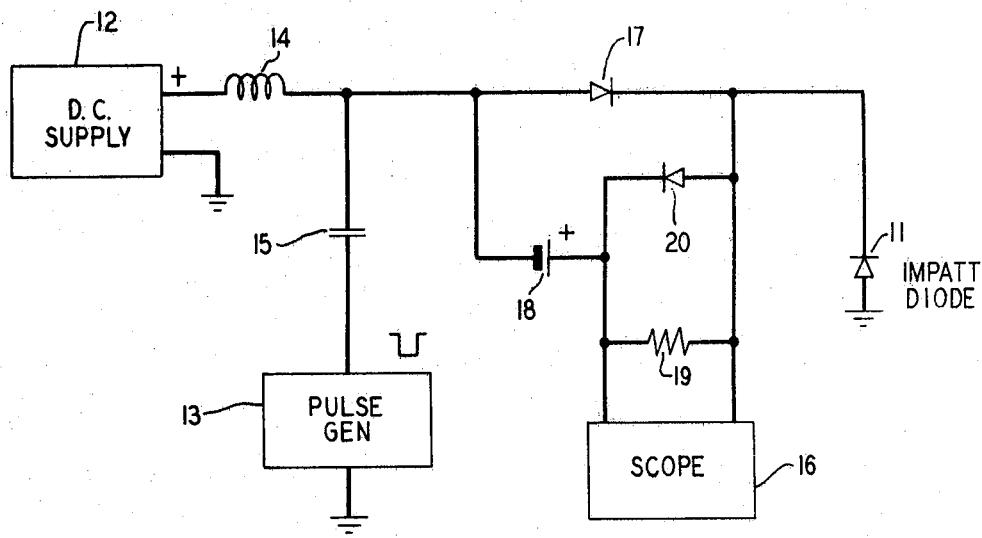
FIG. 1 is a circuit schematic of the test circuit in accordance with this invention.

Turning to FIG. 1 there is shown in schematic form a circuit designed for measuring pulse leakage current of an IMPATT diode in the reverse direction. Connected in series with the IMPATT diode 11 is a d-c supply 12 for maintaining the IMPATT diode in the avalanche operating condition. A pulse generator 13 of the electronic type capable of producing short steep voltage pulses of appropriate polarity is connected in parallel with the d-c supply 12 isolated from it by a suitable inductance element 14 and capacitance element 15. A monitoring resistor 19 is provided in series with the diode 11 under test, across which there is connected an oscilloscope 16 for observing the voltage drop across the monitoring resistor. A first diode 17 in parallel with the monitoring resistor is provided to carry the avalanche current around the resistor during the period when a reverse leakage measurement is not being made. When a pulse of suitable polarity is provided to take the diode out of avalanche condition, the small d-c voltage source 18 cuts off the first diode 17 so that the full current through the diode 11 under test flows through the monitoring resistor 19 and is observed on the oscilloscope 16. The second diode 20 is added across the monitoring resistor 19 to provide a short-circuit upon the initiation of the test pulse to enable rapid withdrawal of the stored charge in the diode 11. In this connection diode refers to an assymetric element for performing the function described.

Figure 2:
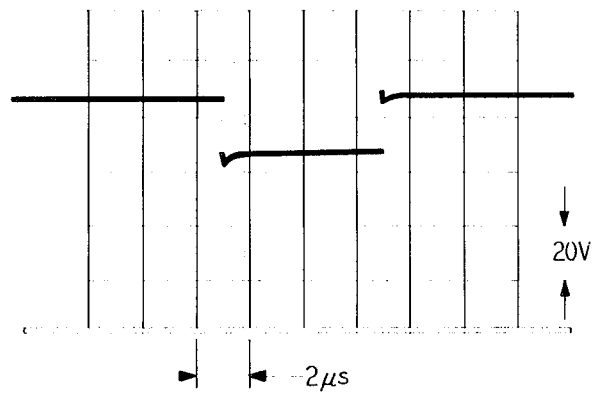
FIGS. 2 and 3 are representative oscilloscope traces depicting the voltage and current across and through an IMPATT diode under test conditions in accordance with this invention.
Figure 3:
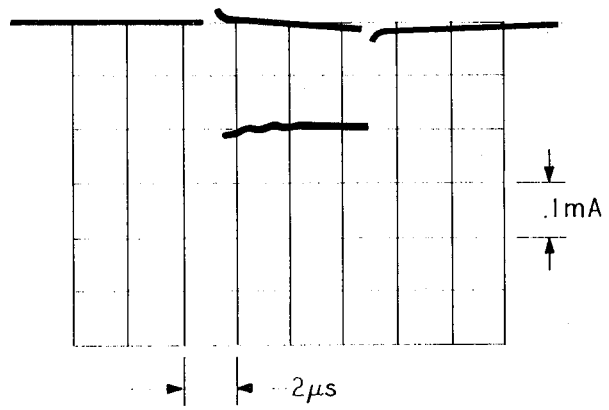

The measuring pulse amplitude is just large enough to drive the IMPATT diode well out of avalanche. Usually a pulse amplitude of 25 to 50 volts and a pulse length of between about 1 and 10 microseconds is sufficient. Referring to FIG. 2 this voltage is depicted as an oscilloscope trace. Typically, as may be seen also from the time scale of the display, the pulse has a duration of from 5 to 6 microseconds. in FIG. 3 the magnitude of the reverse leakage current during this measuring interval is indicated by the displacement from the zero level line at the top of the oscilloscope picture. In the depiction of FIG. 3 the reverse leakage current has a value of about two tenths milliamperes and as will be later observed, indicates at least, a border-line device from the standpoint of the probability of catastrophic failure.

The specific circuit embodiment in which the above responses were observed involved an isolating inductor 14 having a value of 12 microhenries, an isolating capacitor 15 of 1 microfarad and a small d-c voltage source 18 of 1.5 volts. The monitoring resistor 19 had a value of 1,000 ohms.

Figure 4:
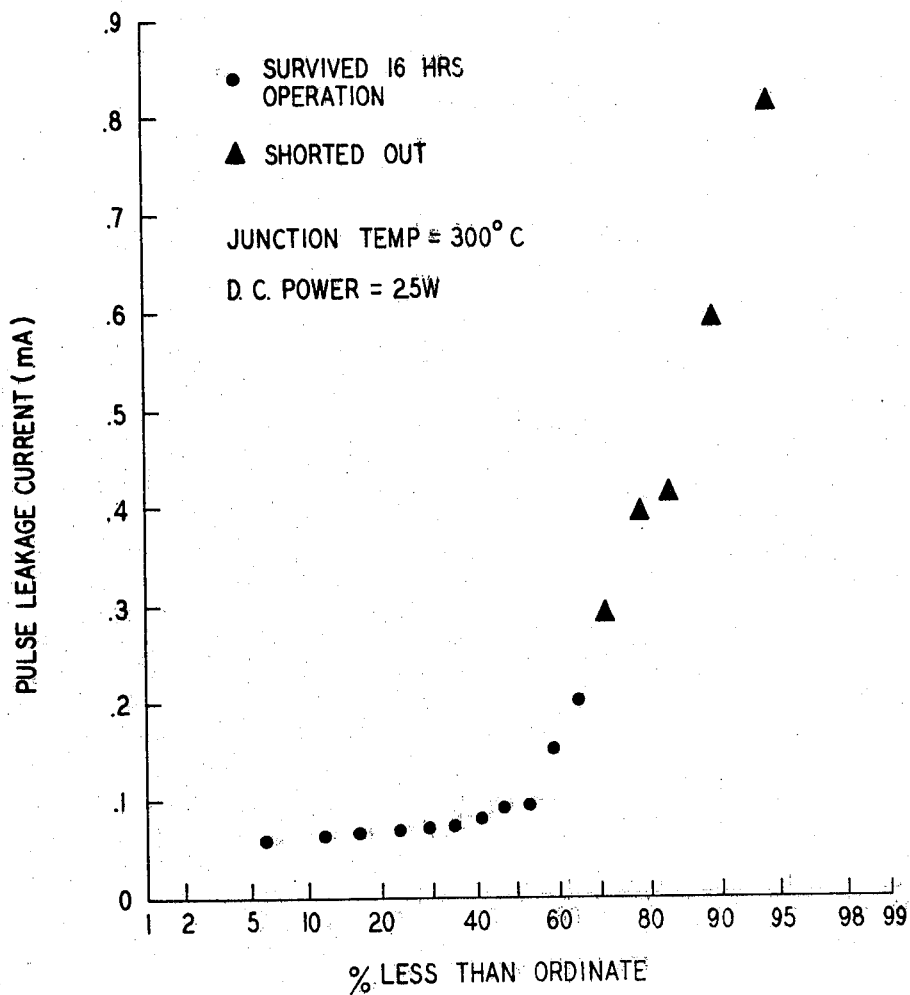
FIG. 4 is a graph showing a plot of a group of 16 IMPATT diodes reliability tested in accordance with this invention.

In a particular test of 16 silicon IMPATT diodes, all of the devices were operated at 25 watts d-c power dissipation producing a junction temperature of about 350°C. The pulse leakage current was monitored for each diode as its power level was brought up to 25 watts. Several of the diodes shorted out as the 25 watt level was approached or reached shortly after that level was reached. FIG. 4 is a graph showing each of the 16 diodes plotted against the observed value of pulse leakage current as the ordinate against a scale indicating the percentage number of diodes in the group found below the diode in question. As previously noted the diodes denoted by the triangular marks shorted out during the test. Two other diodes exhibiting reverse leakage currents of about 0.16 and 0.21 milliamperes, obviously are border-line quality devices and very likely would be discarded.

It is generally advantageous, in order to insure that the pulse leakage current remains stable, to age diodes under d-c avalanche power for a few hours prior to making the reverse leakage current test in accordance with this invention. This aging step affords a reasonable opportunity for the diode under test to come to equilibrium before the leakage is measured.

Although the invention has been disclosed in terms of a particular procedural method and circuit embodiment, certain variations may be made particularly to accommodate particular device characteristics which still will fall within the scope and spirit of the invention.

What is claimed is:

1. A method for evaluating the likelihood of catastrophic failure of an IMPATT diode comprising:
    1. operating said diode in the avalanche condition;
    2. then, applying to said diode a voltage pulse of a magnitude and polarity sufficient to withdraw the diode from the avalanche condition but without going into forward bias, for a short period of time; and
    3. observing the leakage current through said diode during said short period of time.

2. A method for evaluating the likelihood of catastrophic failure of an IMPATT diode comprising:
    1. applying to said IMPATT diode a reverse voltage of a magnitude to place said diode in the avalanche condition;
    2. then, applying to said diode a voltage pulse of a magnitude and polarity sufficient to withdraw the diode from the avalanche condition for a period of from about 1 to 10 microseconds, but without going into forward bias; and
    observing the leakage current through said diode during the application of said voltage pulse.

3. The method in accordance with claim 2 in which said voltage pulse has a magnitude of from about 25 to 50 volts and a duration of about 5 or 6 microseconds.

4. Apparatus for evaluating the likelihood of catastrophic failure of an IMPATT diode comprising first voltage means for biasing said diode in the avalanche condition, second voltage means for applying to said diode a voltage pulse to withdraw the diode from the avalanche condition for a short period of time, but without going into forward bias, and third means for observing the leakage current through said diode during said short period of time.

5. Apparatus in accordance with claim 4 in which said third means includes a resistive element in parallel connection with an oscilloscope.

6. Apparatus in accordance with claim 5 including diode means and voltage means connected so as to bypass avalanche operating current of said first voltage means around said resistive element.

7. Apparatus in accordance with claim 6 including diode means connected so as to withdraw stored charged rapidly from the IMPATT diode under test.

* * * * *